US009096695B2

(12) United States Patent
Kaneumi et al.

(10) Patent No.: US 9,096,695 B2
(45) Date of Patent: *Aug. 4, 2015

(54) METHOD FOR PRODUCING AN AQUEOUS EMULSION

(75) Inventors: Yoshiyama Kaneumi, Ibaraki (JP); Sumiko Mouri, Ibaraki (JP); Katsuyuki Sato, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 279 days.

This patent is subject to a terminal disclaimer.

(21) Appl. No.: 12/993,569

(22) PCT Filed: Jun. 9, 2009

(86) PCT No.: PCT/JP2009/060489
§ 371 (c)(1),
(2), (4) Date: Nov. 19, 2010

(87) PCT Pub. No.: WO2009/151038
PCT Pub. Date: Dec. 17, 2009

(65) Prior Publication Data
US 2011/0086962 A1  Apr. 14, 2011

(30) Foreign Application Priority Data

Jun. 12, 2008  (JP) ................. 2008-153685

(51) Int. Cl.
| | | |
|---|---|---|
| *C08L 27/12* | (2006.01) | |
| *C08F 2/24* | (2006.01) | |
| *C08F 220/24* | (2006.01) | |
| *C09K 3/18* | (2006.01) | |
| *C08F 214/08* | (2006.01) | |
| *C08F 220/18* | (2006.01) | |
| *C08F 220/26* | (2006.01) | |
| *C08F 220/58* | (2006.01) | |

(52) U.S. Cl.
CPC .................. *C08F 2/24* (2013.01); *C08F 220/24* (2013.01); *C09K 3/18* (2013.01); *C08F 214/08* (2013.01); *C08F 220/18* (2013.01); *C08F 220/26* (2013.01); *C08F 220/58* (2013.01)

(58) Field of Classification Search
CPC ............ C08F 2/24; C08F 220/24; C09K 3/18
USPC ........... 523/201; 524/458, 544; 526/201, 203, 526/242, 245
See application file for complete search history.

(56) References Cited

U.S. PATENT DOCUMENTS

| | | | | |
|---|---|---|---|---|
| 5,143,991 | A  * | 9/1992 | Amimoto et al. ............. | 526/245 |
| 6,121,372 | A  * | 9/2000 | Yamamoto et al. ........... | 524/805 |
| 6,153,675 | A  * | 11/2000 | Yamamoto et al. ............. | 524/58 |
| 7,615,592 | B2 * | 11/2009 | Sagawa et al. ................ | 524/507 |
| 2005/0038178 | A1* | 2/2005 | Von Schmittou et al. .... | 524/556 |

FOREIGN PATENT DOCUMENTS

| | | |
|---|---|---|
| JP | 02-001795 | 1/1990 |
| JP | 03-231986 | 10/1991 |
| JP | 07-230080 | 8/1995 |
| JP | 11-080710 | 3/1999 |
| JP | 2003-192961 | 7/2003 |
| JP | 2004-352976 | 12/2004 |
| JP | 2008-266414 | 11/2008 |
| JP | 2009-102463 | 5/2009 |
| WO | WO 2004/035708 A1 | 4/2004 |

OTHER PUBLICATIONS

International Preliminary Report on Patentability and Written Opinion from corresponding PCT application No. PCT/JP2009/060489 dated Jan. 11, 2011, 6 pages.
International Search Report from corresponding PCT application No. PCT/JP2009-060489 dated Sep. 15, 2009, 4 pgs.

* cited by examiner

*Primary Examiner* — David W Wu
*Assistant Examiner* — Marie Reddick
(74) *Attorney, Agent, or Firm* — Brinks Gilson & Lione

(57) ABSTRACT

Disclosed is a method for producing an aqueous emulsion containing a fluorine-containing copolymer comprising, as copolymerizable monomers, (A) at least one of a perfluoroalkylalkyl acrylate and a corresponding methacrylate represented by the general formula: $C_nF_{2n+1}C_mH_{2m}OCOCR=CH_2$, wherein R is hydrogen or methyl group, n is 4, 5, or 6, and m is 1, 2, 3, or 4; (B) benzyl acrylate or benzyl methacrylate; (C) a fluorine-free polymerizable monomer other than benzyl acrylate and benzyl methacrylate; and (D) a crosslinkable group-containing polymerizable monomer; the copolymer being produced by previously subjecting 10 to 80 wt. % of the total weight of component (A) and 0 to 60 wt. % of the total weight of component (B) to a first polymerization reaction using an emulsion polymerization method; and then subjecting the remaining components to a second polymerization reaction using an emulsion polymerization method; wherein an emulsifier is used in the emulsion polymerization reaction in an amount of 21 to 150 parts by weight based on 100 parts by weight of the total weight of polymerizable monomers (A) and (B) used in the first polymerization reaction.

4 Claims, No Drawings

METHOD FOR PRODUCING AN AQUEOUS EMULSION

RELATED APPLICATION

This application is a 35 U.S.C. §371 national phase filing of International Patent Application No. PCT/JP2009/060489, filed Jun. 9, 2009, through which and to which priority is claimed under 35 U.S.C. §119 to Japanese Patent Application No. 2008-153685, filed Jun. 12, 2008.

TECHNICAL FIELD

The present invention relates to a method for producing an aqueous emulsion. More specifically, the present invention relates to a method for producing an aqueous emulsion containing a fluorine-containing copolymer effectively used as, for example, a water- and oil-repellent.

BACKGROUND ART

The development of water- and oil-repellency is attributed to low surface energy of fluorine atoms, and in generally, fluorine-containing acrylate polymers are widely used as the active ingredient of water- and oil-repellents. Various previous studies have shown that the presence of crystallinity in a fluorine-containing polymer is practically necessary for the development of water- and oil-repellency. Particularly, it has been recognized that the hydrophobicity of a fluorine-containing polymer depends on the number of carbon atoms of a side-chain fluoroalkyl group, and that crystallinity is developed when the number of carbon atoms is 8 or more (see Non-Patent Document 1).

Therefore, it has been considered that fluorine-containing polymers having a short fluoroalkyl group (i.e., a side-chain fluoroalkyl group having 7 or less, particularly 6 or less, carbon atoms) have low or no crystallinity, and thus cannot provide sufficient water-repellency for practical use. Moreover, since water- and oil-repellents are required to have washing durability, friction durability, etc., fluorine-containing acrylate polymers having long side-chains are used.

However, polymers having a side chain fluoroalkyl group containing 8 or more carbon atoms are very hard because of their high crystallinity, and causing the problem that flexibility of textile products is impaired. There are other problems such as discoloring of fibers because the water-repellent treatment necessitates high temperature curing. In addition, since polymers having a long side-chain fluoroalkyl group containing 8 or more carbon atoms are excessively hydrophobic, a large amount of emulsifier is required for the production of water- and oil-repellents.

The present applicant has previously proposed a water- and oil-repellent comprising an aqueous emulsion obtained by dispersing a copolymer of a fluoroalkyl group-containing polymerizable monomer and vinylidene chloride or benzyl (meth)acrylate, and a carboxyl group-containing water soluble polymer in water using a nonionic surfactant. The fluoroalkyl group of the fluoroalkyl group-containing polymerizable monomer to be copolymerized with vinylidene chloride or benzyl (meth)acrylate is specified to be a perfluoroalkyl group having 4 to 20 carbon atoms; however, the perfluoroalkyl group used in the polymerization example is specified to be a mixture of perfluoroalkyl groups having 6 to 14 carbon atoms, 9.0 on average (see Patent Document 1).

Therefore, it is considered that if fluorine-containing polymers having a short side-chain fluoroalkyl group containing 6 or less carbon atoms can develop water- and oil-repellency, water- and oil-repellents that can impart excellent flexibility and washing durability to water- and oil-repellent treated fibers can be obtained.

There has also been proposed a surface-treating agent exhibiting excellent water repellency, oil repellency, and antifouling property obtained by using a polymer having a short fluoroalkyl group containing a side chain of 1 to 6 carbon atoms; however, the fluoroalkyl group-containing monomer used herein is a fluorine-containing monomer compound represented by the general formula:

X: F, Cl, Br, I, $CFX^1X^2$, CN, a fluoroalkyl group having 1 to 20 carbon atoms, a benzyl group, or a phenyl group Y: an aliphatic group having 1 to 10 carbon atoms, an aromatic or cyclic aliphatic group having 6 to 10 carbon atoms, a $CH_2CH_2NR^1SO_2$ group, or a $CH_2CH(OY_1)CH_2$ group Rf: a fluoroalkyl group having 1 to 6 carbon atoms Acrylic acid derivatives in which X is H are shown as comparative production examples, and methacrylic acid derivatives in which X is $CH_3$ are intentionally excluded (see Patent Document 2).

There has also been proposed a water- and oil-repellent composition containing, as an essential ingredient, a copolymer comprising, as polymerization units, (a) an Rf group-containing monomer that forms a homopolymer having no melting point or a melting point of 55° C. or less attributable to fine crystals derived from the Rf groups of the homopolymer and having a glass transition temperature of 20° C. or higher; and (b) an Rf group-free monomer having a crosslinkable functional group. The water- and oil-repellent composition can impart excellent water- and oil-repellency to products treated at a low temperature, allows water- and oil-repellent treatment resulting in soft touch, and exhibits excellent durability (see Patent Document 3).

In Patent Document 3, a perfluoroalkylalkyl(meth)acrylate is used as the component (a) monomer; however, a specific monomer, such as a 2-butanone oxime adduct, pyrazole adduct, ε-caprolactam adduct of ω-isocyanate alkyl(meth) acrylate, is used as the component (b) monomer in the copolymerization reaction.

PRIOR ART DOCUMENT

Patent Document

Patent Document 1: JP-A-11-80710
Patent Document 2: JP-A-2004-352976
Patent Document 3: WO 2004/035708
Patent Document 4: JP-B-07-53862

Non-Patent Document

Non-Patent Document 1: Adhesion and Adhesives, Vol. 50, No. 5, pp. 16-22 (2006)

OUTLINE OF THE INVENTION

Problem to be Solved by the Invention

An object of the present invention is to provide a method for producing an aqueous emulsion that contains a copolymer of perfluoroalkylalkyl(meth)acrylate with low bioaccumulation potential, the copolymer being not obtained by copolymerization of a specific monomer, and that is effectively used in water- and oil-repellents, etc. containing the fluorine-containing copolymer as an active ingredient.

Means for Solving the Problem

The object of the present invention can be achieved by an aqueous emulsion containing a fluorine-containing copolymer comprising, as copolymerizable monomers, (A) at least one of a perfluoroalkylalkyl acrylate and methacrylate represented by the general formula:

$$C_nF_{2n+1}C_mH_{2m}OCOCR\!=\!CH_2$$

wherein R is hydrogen or methyl group, n is 4, 5, or 6, and m is 1, 2, 3, or 4;
(B) benzyl acrylate or benzyl methacrylate;
(C) a fluorine-free polymerizable monomer other than benzyl acrylate and benzyl methacrylate; and
(D) a crosslinkable group-containing polymerizable monomer;
the copolymer being produced by previously subjecting 10 to 80 wt. % of the total weight of component (A) and 0 to 60 wt. % of the total weight of component (B) to a first polymerization reaction using an emulsion polymerization method; and then subjecting the remaining components to a second polymerization reaction using an emulsion polymerization method; wherein an emulsifier is used in the emulsion polymerization reaction in an amount of 21 to 150 parts by weight based on 100 parts by weight of the total weight of polymerizable monomers (A) and (B) used in the first polymerization reaction.

Effect of the Invention

The aqueous emulsion obtained by the method of the present invention in which the copolymerization reaction is carried out in two stages contains a copolymer of perfluoroalkylalkyl(meth)acrylate with low bioaccumulation potential, and the copolymer is not obtained by copolymerization of a specific monomer. In addition, a water- and oil-repellent containing the fluorine-containing copolymer as an active ingredient has the excellent effects that the curing temperature during water- and oil-repellent treatment is low, and a water- and oil-repellent treated textile exhibits good water- and oil-repellency, particularly oil-repellency, after washing. The textile to be processed by water- and oil-repellent treatment may be made of either synthetic fibers or natural fibers, and the aqueous emulsion produced by the production method of the present invention allows the formation of water- and oil-repellents that exhibit sufficient water- and oil-repellency to these fibers.

Moreover, in the curing process to cross-link a textile and a water- and oil-repellent, a low cross-linking temperature during curing results in an insufficient reaction, and the desired performance cannot be obtained because of, for example, the removal of the water- and oil-repellent forming polymer. Accordingly, curing is generally carried out at 180° C. for 1 minute or at 170° C. for 1 to 2 minutes, although a curing condition of 160° C. for 3 minutes is rarely used. According to the water- and oil-repellent of the present invention, curing can be carried out at a further lower temperature of 150° C. for 3 minutes, as shown in the examples described later.

EMBODIMENTS FOR CARRYING OUT THE INVENTION

Preferred examples of component (A), i.e., a perfluoroalkylalkyl(meth)acrylate represented by the general formula:

$$C_nF_{2n+1}C_mH_{2m}OCOCR\!=\!CH_2$$

R: hydrogen or methyl group
n: 4, 5 or 6
m: 1, 2, 3 or 4
include compounds of the following formulae:

$$C_4F_9CH_2CH_2OCOCH\!=\!CH_2$$

$$C_4F_9CH_2CH_2OCOC(CH_3)\!=\!H_2$$

$$C_6F_{13}CH_2CH_2OCOCH\!=\!CH_2$$

$$C_6F_{13}CH_2CH_2OCOC(CH_3)\!=\!CH_2$$

Such a perfluoroalkylalkyl(meth)acrylate component (A) is subjected to copolymerization reaction in a proportion of about 10 to 80 wt. %, preferably about 25 to 80 wt. %, and more preferably about 40 to 80 wt. % in the obtained copolymer. The copolymerization of the component (A) monomer allows for the formation of an aqueous dispersion having excellent emulsification stability and developing water- and oil-repellency Component (B), i.e., benzyl acrylate or benzyl methacrylate, is subjected to copolymerization reaction in a proportion of about 5 to 80 wt. %, preferably about 5 to 50 wt. %, and more preferably about 5 to 35 wt. %, in the copolymer. The copolymerization of benzyl(meth)acrylate results in a copolymer having good film-forming property and orientation.

As component (C), i.e., a fluorine-free polymerizable monomer, at least one of vinylidene chloride, alkyl(meth)acrylate having a $C_1$-$C_{18}$ straight or branched alkyl group, cycloalkyl(meth)acrylate, alkoxyalkyl(meth)acrylate having a $C_2$-$C_6$ alkoxyalkyl group, monoalkyl or dialkyl esters of maleic or fumaric acid having a $C_1$-$C_8$ alkyl group, vinyl esters, such as vinyl acetate and vinyl caprylate, etc., are preferably used in terms of the balance of water- and oil-repellency; however, other copolymerizable vinyl compounds, such as styrene, methylstyrene, α-methylstyrene, vinylnaphthalene, (meth)acrylonitrile, acetone acrylamide, vinyl chloride, chloroethyl vinyl ether, hydroxyalkyl vinyl ether having a $C_1$-$C_4$ alkyl group, polyethyleneglycol mono(meth)acrylate, polypropyleneglycol mono(meth)acrylate, etc., can also be used. In addition, diene compounds, such as isoprene, pentadiene, and butadiene, can also be copolymerized.

Such a fluorine-free polymerizable monomer other than benzyl(meth)acrylate is subjected to copolymerization reaction in a proportion of about 5 to 80 wt. %, preferably about 5 to 60 wt. %, and more preferably about 5 to 40 wt. %, in the copolymer.

Examples of component (D), i.e., a crosslinkable group-containing polymerizable monomer, include epoxy group-containing monomers, such as allyl glycidyl ether and glycidyl(meth)acrylate; N-methylol group-containing monomers, such as N-methylol (meth)acrylamide and N-butoxymethylol (meth)acrylamide; hydroxyalkyl group-containing monomers, such as 2-hydroxyethyl(meth)acrylate, 2-hydroxypropyl acrylate, 4-hydroxybutyl acrylate, and 2-hydroxy-3-chloropropyl (meth)acrylate; amide group-containing monomers, such as (meth)acrylamide, N-methylacrylamide, diacetone acrylamide, and compounds represented by the formulae:

$$CH_2\!=\!C(CH_3)CON^-\!\!-\!\!N^+(CH_3)_2CH_2CH(OH)CH_3,$$
and $$CH_2\!=\!C(CH_3)CON^-\!\!-\!\!N^+(CH_3)_3;$$

aziridinyl group-containing monomers, such as aziridinyl ethyl(meth)acrylate; polyol poly(meth)acrylates, such as ethyleneglycol di(meth)acrylate, polyoxyethyleneglycol di(meth)acrylate, and polyoxypropyleneglycol di(meth)acrylate; and the like. Hydrophilic group-containing monomers are preferably used.

Further copolymerization with these crosslinkable group-containing polymerizable monomers makes the adhesion of the fluorine-containing copolymer, which is used as an effective water- and oil-repellency component, to substrates (e.g., fibers) stronger, and results in improvement of durability, washing resistance, dry-cleaning resistance, etc. of water- and oil-repellents. In addition to these effects, a secondary effect of improving the polymerization stability during emulsion polymerization can generally be achieved. Accordingly, component (D) is used in a proportion of about 0.5 to 40 wt. %, and preferably about 1 to 15 wt. %, in the copolymer.

The copolymerization reaction using various polymerizable monomers, as described above, is carried out in the following manner. First, 10 to 80 wt. %, and preferably 20 to 50 wt. %, of the total weight of component (A), which is used in a proportion of 10 to 80 wt. %, and preferably 25 to 80 wt. %, of the total charged monomers; or 0 to 60 wt. %, and preferably 0 to 45 wt. %, of the total weight of component (B), which is used in a proportion of 5 to 80 wt. %, and preferably 5 to 50 wt. %, of the total charged monomers together with component (A), is previously subjected to polymerization reaction using an emulsion polymerization method in the presence of an emulsifier, preferably a surface-active emulsifier using at least one of a polyethylene oxide added type nonionic surfactant and a cationic surfactant (first polymerization reaction). Subsequently, the remaining components are subjected to polymerization reaction using an emulsion polymerization method (second polymerization reaction). A water- and oil-repellent prepared from the aqueous emulsion obtained by two-stage polymerization reaction, when used in water- and oil-repellent treatment of textiles, exhibits excellent water- and oil-repellency, particularly oil-repellency, after washing. The touch of the water- and oil-repellent treated textiles is not hardened, but rather is softened; thus, the touch of the textiles is improved.

Here, Patent Document 4 proposes a method for producing particles of a polymer having a polyfluoroalkyl group, the method comprises polymerizing a second monomer comprising at least one vinyl monomer in a polymerization system comprising particles of a first polymer obtained by emulsion polymerization of a first monomer comprising at least one vinyl monomer, and a polymerization medium in the presence or absence of an emulsifier at a concentration where micelles of the second monomer are hardly formed, to form a second polymer as a polymer of the second monomer on the surface or in the inside of the particles of the first polymer, wherein at least one of the first and second monomers contains a polyfluoroalkyl group-containing vinyl monomer. However, during core polymerization, the emulsifier is required to adjust a concentration below the critical micelle concentration, and there are problems such as precipitation of unemulsified monomers. For these reasons, industrial mass production is hardly realized.

The surface-active emulsifier is used in a proportion of 1 to 20 parts by weight, and preferably 2 to 15 parts by weight, based on 100 parts by weight of the total weight of the polymerizable monomers used in the first and second polymerization reactions. At this time, the surface-active emulsifier must be used in a proportion of 21 to 150 parts by weight, and preferably 24 to 100 parts by weight, based on 100 parts by weight of the total weight of polymerizable monomers (A) and (B) used in the first polymerization reaction. When the amount of the surface-active emulsifier used in the first polymerization reaction is less than this range, the obtained aqueous emulsion has a large particle size, and the precipitation rate after polymerization is higher, which is not preferable.

Examples of polyethyleneoxide added type nonionic surfactants include condensation reaction products of polyethyleneoxide with hexylphenol, octylphenol, nonylphenol, polycyclic phenyl ether, hexadecanol, oleic acid, $C_{12}$-$C_{18}$ alkylamine, sorbitan mono fatty acid, or the like; preferably condensation products of polyethyleneoxide with polycyclic phenyl ether. Further, examples of usable cationic surfactants include stearyl trimethyl ammonium chloride, dodecyl trimethyl ammonium acetate, dodecyl trimethyl ammonium chloride, tetradecyl trimethyl ammonium chloride, hexadecyl trimethyl ammonium chloride, octadecyl trimethyl ammonium chloride, dodecyl benzyl trimethyl ammonium chloride, dodecyl methyl di(polyoxyethylene)ammonium chloride, dioctadecyl dimethyl ammonium chloride, and other quaternary ammonium salts; and alkyl pyridinium salts.

In place of these cationic surfactants, a product obtained by neutralizing amine compounds having a polyethyleneoxide chain with an organic acid, such as acetic acid can be used, and examples of amine compounds include polyoxyethylene octadecylamine (e.g., Amete 320; a product of Kao); polyoxyethylene alkyldiamine represented by the general formula:

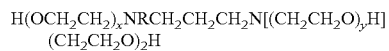

(e.g., Ethoduomeen T/25; a product of Lion); and polyoxyethylene dodecylamine (e.g., Nymeen L-207; a product of NOF Corporation).

When a polyethyleneoxide added type nonionic surfactant and a cationic surfactant are used in combination as emulsifiers, the amount of polyethyleneoxide added type nonionic surfactant is about 60 wt. % or more, and preferably about 80 wt. % or more, in the total amount of both surfactants.

Together with these emulsifiers, an emulsification aid, and preferably a glycol-based compound, is used in a proportion of 1 to 100 parts by weight, and preferably 5 to 50 parts by weight, based on 100 parts by weight of the total weight of the polymerizable monomers. Examples of glycol-based compounds (i.e., emulsification aids) include polyethyleneglycol (n=2 to 4 or more), polypropyleneglycol (n=2 to 4 or more), or terminal monomethyl ethers thereof, propyleneglycol adducts of glycerin, and the like; preferably, polypropyleneglycol-based compounds having a molecular weight of about 300 to 3000 are used.

In both first and second polymerization reactions, emulsification of the mixture of perfluoroalkylalkyl(meth)acrylate and other polymerizable monomers is carried out in the presence of a surface-active emulsifier (and an emulsification aid) before the copolymerization reaction. The emulsification is sufficiently performed using a high-pressure homogenizer, or the like.

The copolymerization reaction of the emulsified polymerizable monomer mixture is carried out in the presence of a radical polymerization initiator added thereto. As the radical polymerization initiator, any of organic peroxides, azo compounds, persulfates, and the like can be used; however, water-soluble organic peroxides, such as 2,2'-azobis(2-amidinopropane)-dihydrochloride, are preferably used in a proportion of about 0.1 to 10 wt. %, and preferably about 0.5 to 7 wt. %, based on the total weight of the polymerizable monomer mixture.

As for the copolymerization reactions, both first and second polymerization reactions are carried out in an aqueous medium at about 40 to 80° C. for about 1 to 10 hours to form an aqueous dispersion (aqueous emulsion), which is to be used as a water- and oil-repellent stock solution, in a solid matter content of about 15 to 35 wt. % therein. Here, the aqueous dispersion obtained by the first polymerization reaction is directly used in the second polymerization reaction, and thereby the aqueous emulsion of the present invention is formed.

As the aqueous medium, water may be used alone. Alternatively, a water-soluble organic solvent may be used preferably in an amount of about 1 to 30 wt. % in the aqueous medium, and examples thereof include ketones, such as acetone and methyl ethyl ketone; alcohols, such as methanol and ethanol; glycols, such as ethyleneglycol, propyleneglycol, hexyleneglycol, dipropyleneglycol or monomethyl ethers thereof, and tripropyleneglycol; and the like. A molecular weight modifier may also be used in the reaction, and preferred examples thereof include alkyl mercaptans, such as n-octyl mercaptan, n-dodecyl mercaptan, and tert-dodecyl mercaptan.

The aqueous emulsion obtained in this manner, which is used as a water- and oil-repellent stock solution, is diluted to a solids content of about 0.1 to 10 wt. % with water, and preferably ion exchange water. The resultant can effectively be applied as a water- and oil-repellent to fiber, cloth, fabric, paper, film, carpet, or textile products made of filament, fiber, yarn, etc. As the application method, coating, immersing, spraying, padding, roll coating, or a combination of these methods are used. For example, the water- and oil-repellent is used as a pad bath by adjusting the solids content of the bath to about 0.1 to 10 wt. %. A material to be processed is padded in the pad bath, and the excessive solution is removed by squeeze rolls, followed by drying. The resultant is then applied to the material so that the amount of the fluorine-containing polymer adhered to the material is about 0.01 to 10 wt. %. Thereafter, although depending on the type of material to be processed, drying is generally carried out at a temperature of about 80 to 120° C. for about 1 minute to about 2 hours; and subsequently, curing is carried out under low temperature conditions, i.e., about 150 to 180° C., preferably about 150 to 170° C. for about 1 to 3 minutes, and particularly preferably at 150° C. for 3 minutes. Thus, the water- and oil-repellent treatment is completed.

EXAMPLES

The present invention is described below with reference to examples.

Example 1

| | |
|---|---|
| 2-(n-perfluorohexyl)ethyl methacrylate [FAMAC-6] | 19.4 g |
| Lauryl mercaptan chain transfer agent | 0.5 g |
| Polyoxyethylene polycyclic phenyl ether surfactant (Newcol-740, a product of Nippon Nyukazai Co., Ltd.; 60% aqueous solution) | 14.0 g |
| Hexyleneglycol | 35.0 g |
| Ion-exchange water | 257.9 g |

The above components were placed in a 1 L glass reactor and mixed. The mixture was further mixed and emulsified using a high-pressure homogenizer, and the obtained emulsion was replaced by nitrogen gas for 30 minutes. Then, the temperature in the reactor was gradually increased, and when the temperature reached 40° C., 2.8 g of 2,2'-azobis(2-amidinopropane)-dihydrochloride (dissolved in 20 g of ion-exchange water) was added thereto. The inside temperature was further increased gradually to 70° C., and a polymerization reaction (first polymerization reaction) was carried out at this temperature for 4 hours, followed by cooling.

The obtained first polymerization reaction solution and the following components:

| | |
|---|---|
| 2-(n-perfluorohexyl)ethyl methacrylate [FAMAC-6] | 38.9 g |
| Benzyl methacrylate [BzMA] | 29.2 g |
| 2-hydroxyethyl methacrylate [2HEMA] | 5.6 g |
| Polyethyleneglycol (n = 4) monomethacrylate (PE-200, a product of NOF Corporation) | 11.7 g |
| Lauryl mercaptan | 0.5 g | were placed in a 1 L glass reactor and mixed. The mixture was further mixed and emulsified using a high-pressure homogenizer, and the obtained emulsion was replaced by nitrogen gas for 30 minutes. Then, the temperature in the reactor was gradually increased, and when the temperature reached 40° C., the following components:

| | |
|---|---|
| Vinylidene chloride [VDC] | 17.5 g |
| N-methylolacrylamide [NMAM] | 5.6 g |
| 2,2'-azobis(2-amidinopropane)•dihydrochloride (dissolved in 40 g of ion-exchange water) | 1.4 g | were added thereto (total amount: 500.0 g). The inside temperature was further increased gradually to 70° C., and a polymerization reaction (second polymerization reaction) was carried out at this temperature for 4 hours. After the reaction was completed, the resulting mixture was cooled, thereby obtaining 492 g of aqueous emulsion containing a fluorine-containing copolymer in a solid matter content of 25.8 wt. %. The amount of emulsifier was 43.3 parts by weight based on 100 parts by weight of both components (A) and (B) used in the first polymerization reaction.

Example 2

In the first polymerization reaction of Example 1, the amounts of polyoxyethylene polycyclic phenyl ether surfactant and ion-exchange water were changed to 7.0 g and 265 g, respectively. Under these conditions, a polymerization reaction was carried out (total amount including water: 500.0 g), thereby obtaining 492 g of aqueous emulsion containing a fluorine-containing copolymer in a solid matter content of 25.6 wt. %. The amount of emulsifier was 21.7 parts by weight based on 100 parts by weight of both components (A) and (B) used in the first polymerization reaction.

Example 3

In the first polymerization reaction of Example 1, the amounts of polyoxyethylene polycyclic phenyl ether surfactant and ion-exchange water were changed to 28.1 g and 243.9 g, respectively. Under these conditions, a polymerization reaction was carried out (total amount including water: 500.0 g), thereby obtaining 491.5 g of aqueous emulsion containing a fluorine-containing copolymer in a solid matter content of 26.0 wt. %. The amount of emulsifier was 86.9 parts by weight based on 100 parts by weight of both components (A) and (B) used in the first polymerization reaction.

Example 4

In the first polymerization reaction of Example 1, 9.7 g of benzyl methacrylate was further used, and the amount of ion-exchange water was changed to 257.9 g; and in the second polymerization reaction, the amount of benzyl methacrylate was changed to 19.5 g. Under these conditions, first and second polymerization reactions were carried out (total amount including water: 500.0 g), thereby obtaining 490.4 g of aqueous emulsion containing a fluorine-containing copolymer in a solid matter content of 26.2 wt. %. The amount of emulsifier was 28.9 parts by weight based on 100 parts by weight of both components (A) and (B) used in the first polymerization reaction.

Example 5

In the first polymerization reaction of Example 1, 3.9 g of 2-(n-perfluorohexyl)ethyl acrylate was further used, and the amount of 2-(n-perfluorohexyl)ethyl methacrylate was changed to 15.5 g. Under these conditions, a polymerization reaction was carried out, thereby obtaining 490.8 g of aqueous emulsion containing a fluorine-containing copolymer in a solid matter content of 26.2 wt. %. The amount of emulsifier was 43.3 parts by weight based on 100 parts by weight of both components (A) and (B) used in the first polymerization reaction.

Example 6

In the first polymerization reaction of Example 1, 3.9 g of 2-(n-perfluorohexyl)ethyl acrylate was further used, and the amount of 2-(n-perfluorohexyl)ethyl methacrylate was changed to 15.5 g; and in the second polymerization reaction, 7.8 g of 2-(n-perfluorohexyl)ethyl acrylate was further used, and the amount of 2-(n-perfluorohexyl)ethyl methacrylate was changed to 31.1 g. Under these conditions, each polymerization reaction was carried out, thereby obtaining 492.3 g of aqueous emulsion containing a fluorine-containing copolymer in a solid matter content of 26.0 wt. %. The amount of emulsifier was 43.3 parts by weight based on 100 parts by weight of both components (A) and (B) used in the first polymerization reaction.

Example 7

In the second polymerization reaction of Example 1, 7.8 g of 2-(n-perfluorohexyl)ethyl acrylate was further used, and the amount of 2-(n-perfluorohexyl)ethyl methacrylate was changed to 31.1 g. Under these conditions, a polymerization reaction was carried out, thereby obtaining 492.4 g of aqueous emulsion containing a fluorine-containing copolymer in a solid matter content of 26.0 wt. %. The amount of emulsifier was 43.3 parts by weight based on 100 parts by weight of both components (A) and (B) used in the first polymerization reaction.

Example 8

In the first polymerization reaction of Example 1, the amounts of 2-(n-perfluorohexyl)ethyl methacrylate and ion-exchange water were changed to 27.4 g and 254.6 g, respectively. Under these conditions, a polymerization reaction was carried out. The obtained first polymerization reaction solution and the following components:

| | |
|---|---|
| 2-(n-perfluorohexyl)ethyl methacrylate | 54.8 g |
| Benzyl methacrylate | 22.4 g |
| 2-hydroxyethyl methacrylate | 5.6 g |
| Polyethyleneglycol (n = 4) monomethacrylate (PE-200) | 4.2 g |
| Lauryl mercaptan | 0.5 g | were placed in a 1 L glass reactor and mixed. The mixture was further mixed and emulsified using a high-pressure homogenizer, and the obtained emulsion was replaced by nitrogen gas for 30 minutes. Then, the temperature in the reactor was gradually increased, and when the temperature reached 40° C., the following components:

| | |
|---|---|
| Vinylidene chloride | 11.2 g |
| N-methylolacrylamide | 5.6 g |
| 2,2'-azobis(2-amidinopropane)•dihydrochloride (dissolved in 40 g of ion-exchange water) | 1.4 g | were added thereto (total amount including water: 500.0 g). The inside temperature was further increased gradually to 70° C., and a polymerization reaction (second polymerization reaction) was carried out at this temperature for 4 hours. After the reaction was completed, the resulting mixture was cooled, thereby obtaining 491.5 g of aqueous emulsion containing a fluorine-containing copolymer in a solid matter content of 26.2 wt. %. The amount of emulsifier was 30.7 parts by weight based on 100 parts by weight of both components (A) and (B) used in the first polymerization reaction.

Example 9

In the second polymerization reaction of Example 8, 11.0 g of 2-(n-perfluorohexyl)ethyl acrylate was further used, and the amount of 2-(n-perfluorohexyl)ethyl methacrylate was changed to 43.8 g. Under these conditions, a polymerization reaction was carried out (total amount including water: 500.0 g), thereby obtaining 490.2 g of aqueous emulsion containing a fluorine-containing copolymer in a solid matter content of 26.2 wt. %. The amount of emulsifier was 30.7 parts by weight based on 100 parts by weight of both components (A) and (B) used in the first polymerization reaction.

Example 10

In the first polymerization reaction of Example 8, the amounts of 2-(n-perfluorohexyl)ethyl methacrylate and ion-exchange water were changed to 34.2 g and 247.8 g, respectively. Under these conditions, a polymerization reaction was carried out (total amount including water: 500.0 g), thereby obtaining 491.5 g of aqueous emulsion containing a fluorine-containing copolymer in a solid matter content of 26.2 wt. %. The amount of emulsifier was 24.6 parts by weight based on 100 parts by weight of both components (A) and (B) used in the first polymerization reaction.

Comparative Example 1

In the first polymerization reaction of Example 1, the amount of polyoxyethylene polycyclic phenyl ether surfactant (Newcol-740) was changed to 1.4 g. Under this condition, a polymerization reaction was carried out (total amount including water: 500.0 g), thereby obtaining 460.2 g of aqueous emulsion containing a fluorine-containing copolymer in a solid matter content of 23.5 wt. %. The amount of emulsifier was 4.3 parts by weight based on 100 parts by weight of both components (A) and (B) used in the first polymerization reaction.

Comparative Example 2

| | |
|---|---|
| 2-(n-perfluorohexyl)ethyl methacrylate | 58.3 g |
| Benzyl methacrylate | 29.2 g |
| 2-hydroxyethyl methacrylate | 5.6 g |
| Polyethyleneglycol (n = 4) monomethacrylate (PE-200) | 11.7 g |
| Lauryl mercaptan | 0.5 g |
| Polyoxyethylene polycyclic phenyl ether (Newcol-740) | 14.0 g |
| Hexyleneglycol | 35.0 g |
| Ion-exchange water | 279.8 g |

The above components were placed in a 1 L glass reactor and mixed. The mixture was further mixed and emulsified using a high-pressure homogenizer, and the obtained emulsion was replaced by nitrogen gas for 30 minutes. Then, the temperature in the reactor was gradually increased, and when the temperature reached 40° C., the following components:

| | |
|---|---|
| Vinylidene chloride | 17.5 g |
| N-methylolacrylamide | 5.6 g |
| 2,2'-azobis(2-amidinopropane)·dihydrochloride (dissolved in 40 g of ion-exchange water) | 2.8 g | were added thereto (total amount including water: 500.0 g). The inside temperature was further increased gradually to 70° C., and a polymerization reaction (second polymerization reaction only) was carried out at this temperature for 4 hours. After the reaction was completed, the resulting mixture was cooled, thereby obtaining 492.0 g of aqueous emulsion containing a fluorine-containing copolymer in a solid matter content of 25.8 wt. %.

Comparative Example 3

In Comparative Example 2, the amounts of 2-(n-perfluorohexyl)ethyl methacrylate, benzyl methacrylate, polyethyleneglycol (n=4) monomethacrylate, vinylidene chloride, and ion-exchange water were changed to 82.2 g, 22.4 g, 4.2 g, 11.2 g, and 316.5 g, respectively. Under these conditions, a polymerization reaction was carried out (total amount including water: 500.0 g), thereby obtaining 290.8 g of aqueous emulsion containing a fluorine-containing copolymer in a solid matter content of 26.1 wt. %.

The aqueous emulsions each obtained in the above examples and comparative examples were measured for precipitation rate and particle size.

Precipitation rate: 800 ml of aqueous emulsion was taken in a centrifuge tube, and separated at 3000 rpm for 30 minutes. The precipitate was dried at 120° C. for 3 hours. Then, the precipitation rate was calculated from the weight of the precipitate.

Particle size: Using a particle distribution analyzer MICROTRAC UPA 150, the particle sizes at cumulative frequencies of 10%, 50%, and 90% in order of increasing particle size were measured as 10% particle size, 50% particle size (median particle size), and 90% particle size, respectively.

The solid matter content of each aqueous emulsion was diluted to 0.5 wt. % with ion-exchange water, and a cotton fabric, a cotton-polyester mixed fabric, a polyester fabric, or a nylon fabric were immersed therein. The fabrics in the early stage of immersion and the fabrics after washing 10 times, followed by air drying (HL-10) were measured for water-repellency (according to JIS L1092) and oil-repellency (according to AATCC-TM118-1992). The wet pick-up after squeezing was as follows: cotton fabric (C) and polyester-cotton mixed fabric (PE/C): 100%, polyester fabric (PE): 40%, and nylon fabric (N): 60%. For all of the fabrics, the drying condition was 80° C. for 10 minutes; and the curing condition was 150° C. for 3 minutes.

The water-repellency was evaluated in accordance with the requirements of JIS L1092 described above.

| Water-repellency grade | Condition |
|---|---|
| 100 | No moisture or droplets are attached to the surface |
| 90 | Few droplets are attached to the surface |
| 80 | The surface is partially moist in places |
| 70 | Half of the surface is moist |
| 50 | The entire surface is moist |
| 0 | Both front and back surfaces are completely moist |

The oil-repellency was evaluated in accordance with the requirements of AATCC-TM118-1992 described above. A drop of a test solution was applied on an oil-repellent treated fabric, and the state of the droplet after 30 seconds was observed. When the dropped test solution was kept on the fabric, another test was performed using a test solution with a larger number. Using a test solution that was marginally kept on the fabric, the oil-repellency was evaluated on the basis of the oil-repellency evaluation shown in the following table (the case where 100% nujol is not kept is scored as 0).

| Oil-repellency No. | Test solution | Surface tension (mN/m, 25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | Nujol-n-hexadecane (volume ratio = 65%:35%) | 29.6 |
| 1 | Nujol | 31.2 |

The obtained results are shown in the following table.

TABLE

| | | Particle size (nm) | | | Water-repellency evaluation/oil-repellency evaluation | | | | | | | |
|---|---|---|---|---|---|---|---|---|---|---|---|---|
| | | | | | Early stage of immersion | | | | Air-dried (HL-10) | | | |
| Ex. | Precipitation rate (%) | 10% | 50% | 90% | C | PE/C | PE | N | C | PE/C | PE | N |
| Ex. 1 | 0.001 | 82 | 131 | 202 | 100/4 | 100/5 | 100/5 | 100/5 | 70/4 | 100/5 | 100/5 | 100/5 |
| Ex. 2 | 0.003 | 89 | 141 | 210 | 100/4 | 100/5 | 100/5 | 100/5 | 70/4 | 100/5 | 100/5 | 100/5 |
| Ex. 3 | 0.001 | 80 | 115 | 192 | 100/4 | 100/5 | 100/5 | 100/5 | 70/4 | 100/5 | 100/5 | 100/5 |
| Ex. 4 | 0.001 | 81 | 130 | 203 | 100/4 | 100/5 | 100/5 | 100/5 | 70/4 | 100/5 | 100/5 | 100/5 |
| Ex. 5 | 0.001 | 79 | 128 | 205 | 80/5 | 100/6 | 100/6 | 100/6 | 50/5 | 100/6 | 100/6 | 100/6 |

TABLE-continued

| | Precipitation | Particle size (nm) | | | Water-repellency evaluation/oil-repellency evaluation | | | | | | | |
| | | | | | Early stage of immersion | | | | Air-dried (HL-10) | | | |
| Ex. | rate (%) | 10% | 50% | 90% | C | PE/C | PE | N | C | PE/C | PE | N |
|---|---|---|---|---|---|---|---|---|---|---|---|---|
| Ex. 6 | 0.002 | 85 | 139 | 211 | 70/5 | 80/6 | 100/6 | 100/6 | 50/5 | 70/6 | 100/6 | 100/6 |
| Ex. 7 | 0.001 | 82 | 141 | 210 | 100/5 | 100/5 | 100/6 | 100/6 | 100/5 | 100/5 | 100/6 | 100/6 |
| Ex. 8 | 0.003 | 80 | 140 | 204 | 100/5 | 100/6 | 100/6 | 100/6 | 100/5 | 100/6 | 100/6 | 100/6 |
| Ex. 9 | 0.002 | 89 | 141 | 210 | 100/5 | 100/6 | 100/6 | 100/7 | 100/5 | 100/6 | 100/6 | 100/7 |
| Ex. 10 | 0.003 | 85 | 141 | 205 | 100/5 | 100/6 | 100/6 | 100/6 | 100/5 | 100/6 | 100/6 | 100/6 |
| Comp. Ex. 1 | 1.030 | 246 | 373 | 1111 | 100/5 | 100/5 | 100/5 | 100/5 | 100/5 | 100/5 | 100/5 | 100/6 |
| Comp. Ex. 2 | 0.002 | 89 | 141 | 210 | 100/1 | 100/4 | 100/4 | 100/5 | 50/0 | 70/0 | 100/4 | 100/4 |
| Comp. Ex. 3 | 0.002 | 88 | 140 | 210 | 100/4 | 100/5 | 100/5 | 100/6 | 70/1 | 80/4 | 100/5 | 100/5 |

The invention claimed is:

1. A method of producing an aqueous emulsion containing a fluorine-containing copolymer by using an emulsion polymerization reaction, said method comprising:
   providing, as copolymerizable monomers,
   (A) at least one of a perfluoroalkylalkyl acrylate and a corresponding methacrylate represented by the formula:

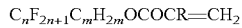
   $C_nF_{2n+1}C_mH_{2m}OCOCR\!=\!CH_2$ wherein R is hydrogen or methyl group, n is 4, 5, or 6, and m is 1, 2, 3 or 4;
   (B) benzyl acrylate or benzyl methacrylate;
   (C) a fluorine-free polymerizable monomer that does not contain a crosslinkable group and is other that benzyl acrylate or benzyl methacrylate; and
   (D) a crosslinkable group-containing polymerizable monomer,
   conducting a first polymerization reaction in which 10 to 80 wt. % of a total weight of component (A), 0 to 60 wt. % of a total weight of component (B) and none of components (C) and (D) are used to form an initial polymer emulsion and thereafter a second polymerization in which the initial polymer emulsion produced by the first polymerization reaction and the remaining portions of the total amounts of component (A) and (B) and total amounts of components (C) and (D) are used to produce a final polymer emulsion,
   wherein an emulsifier is used in the first polymerization reaction in an amount of 21 to 150 parts by weight based on 100 parts by weight of the total amount of components (A) and (B) used in the first polymerization reaction.

2. The method for producing an aqueous emulsion according to claim 1, wherein the fluorine-containing copolymer has a copolymerization composition comprising, based on the total amount of components (A), (B), (C) and (D): 10 to 80 wt. % of component (A), 5 to 80 wt. % of component (B), 5 to 80 wt. % of component (C), and 0.5 to 40 wt. % of component (D).

3. The method for producing an aqueous emulsion according to claim 1, wherein the emulsifier is at least one of a polyethyleneoxide adduct nonionic surfactant and a cationic surfactant.

4. The method for producing an aqueous emulsion according to claim 1, wherein the aqueous emulsion obtained by an emulsion polymerization method is further diluted with water to a concentration sufficient for use as a water- and oil-repellent.

* * * * *